United States Patent [19]

Sich

[11] Patent Number: 5,240,227
[45] Date of Patent: Aug. 31, 1993

[54] ELECTROMAGNETICALLY OPERATED VALVE

[75] Inventor: Bernhard Sich, Freiberg, Fed. Rep. of Germany

[73] Assignee: Robert Bosch GmbH, Stuttgart, Fed. Rep. of Germany

[21] Appl. No.: 859,684

[22] PCT Filed: Jan. 9, 1991

[86] PCT No.: PCT/DE91/00005
§ 371 Date: Jun. 8, 1992
§ 102(e) Date: Jun. 8, 1992

[87] PCT Pub. No.: WO91/10854
PCT Pub. Date: Jul. 25, 1991

[30] Foreign Application Priority Data

May 26, 1990 [DE] Fed. Rep. of Germany ....... 4016990
Jan. 20, 1991 [DE] Fed. Rep. of Germany ....... 4001562

[51] Int. Cl.$^5$ .............................................. F16K 31/06
[52] U.S. Cl. .......................... 251/129.16; 251/129.15; 251/129.17
[58] Field of Search ...................... 251/129.17, 129.16, 251/129.15

[56] References Cited

U.S. PATENT DOCUMENTS 5,060,695 10/1991 McCabe ................... 137/625.61

FOREIGN PATENT DOCUMENTS 1204485 11/1965 Fed. Rep. of Germany .
8809143 12/1989 Fed. Rep. of Germany .

*Primary Examiner*—Arnold Rosenthal
*Attorney, Agent, or Firm*—Michael J. Striker

[57] ABSTRACT

The electromagnetically operated valve communicating with a pressurized fluid in an oil-filled chamber, includes an armature (17) resiliently retained in an armature chamber (16) of a housing (10) by membrane springs (22,23); an armature-operated valve body (20) movable with clearance in a hole (34) provided in the housing (10) and a compression spring (40) biasing the armature. The armature chamber (16) is hermetically sealed in the housing from a valve part (15) against which the valve body (20) is urged by the compression spring and contains a damping fluid for damping motions of the armature. The housing is also provided with a first compensating chamber (44) communicating with the armature chamber (16) to compensate for a volume change of the damping fluid and with a second compensating chamber (46) connected with the first compensating chamber via a duct (45). The second compensating chamber is filled with air and communicates with the oil-filled chamber filled with the pressurized fluid so that dirt and other particles in the pressurized fluid cannot reach the damping fluid of the armature chamber.

9 Claims, 2 Drawing Sheets

5,240,227

ELECTROMAGNETICALLY OPERATED VALVE

BACKGROUND OF THE INVENTION

The present invention relates to an electromagnetically operated valve.

Electromagnetically operated valves communicating with a pressurized fluid in an oil-filled chamber, for example of a gear housing in a motor vehicle, are known. An electromagnetically operated valve of this type comprises a housing; an armature resiliently retained in an armature chamber of the housing by spring retaining means; an armature operated valve body for control of a pressurized medium movable with clearance in a hole provided in the housing and a spring biasing means urging the armature toward a valve part. The armature chamber contains a damping fluid for damping motions of the armature and is hermetically sealed from the valve part toward which the valve body is urged by a rubber membrane. The housing is also provided with a compensating chamber communicating with the armature chamber and arranged on a side of the housing remote from the armature to compensate for volume changes of the damping fluid.

Such known valves are very often connected via an aperture in the armature chamber, to a pressurized oil filled chamber which houses the valve. In such an arrangement, it can happen that particles of dirt enter into the armature chamber and impair the function of the valve. Attempts have been made to prevent this occurrence by fitting filters or by means of intermediate volumes, but this is costly.

SUMMARY OF THE INVENTION

It is an object of the present invention to provide an improved electromagnetically operated valve of the above-described type, which does not have the above-mentioned disadvantage.

These objects and others which will be made more apparent hereinafter are attained in an electromagnetically operated valve communicating with a pressurized fluid in an oil-filled chamber, comprising a housing; an armature resiliently retained in an armature chamber of the housing by spring retaining means, advantageously membrane springs; an armature-operated valve body for control of a pressurized medium movable with clearance in a hole provided in the housing and a spring biasing means, advantageously a compression spring, held in the housing and biasing the armature. The armature chamber contains a damping fluid for damping motions of the armature and the housing is also provided with a first compensating chamber communicating with the armature chamber and arranged in an end of the housing remote from the armature to compensate for a volume change of the damping fluid.

According to the invention, the housing is also provided with a second compensating chamber connected with the first compensating chamber via a duct. The second compensating chamber is filled with air and communicates with the oil-filled chamber filled with the pressurized fluid so that dirt and other particles in the pressurized fluid cannot contaminate the damping fluid of the armature chamber.

In contrast, the valve in accordance with the invention with the characterizing features of the main claim has the advantage that the ingress of dirty oil into the valve, in particular into the armature chamber, is prevented in a simple manner.

In one embodiment of the invention the valve is arranged in an oil-filled engine part in the oil-filled chamber so that air cannot escape from the second compensating chamber, even through it is open to the oil filled chamber. For example, an oil-filled gear housing can contain the oil-filled chamber in which the valve is mounted and can include means for fully flushing an oil in the oil-filled gear housing through the valve housing.

The valve can also include a valve part against which the valve body is urged by action of the spring-biasing means and a rubber membrane in the housing between the armature chamber and the valve part for hermetically sealing the armature chamber from the valve part.

In another embodiment of the invention the electromagnetically operated valve also includes a gauze insert located in an opening between the first compensating chamber and the second compensating chamber for preventing flow of the damping fluid from the first compensating chamber to the second compensating chamber filled with the air. The gauze insert can be in the shape of a beaker having an open end closest to the first compensating chamber, the first compensating chamber being closer to the armature than the second compensating chamber.

BRIEF DESCRIPTION OF THE DRAWING

The objects, features and advantages of the present invention will now be illustrated in more detail by the following detailed description, reference being made to the accompanying drawing in which.

DESCRIPTION OF THE PREFERRED EMBODIMENTS

Figure 1:
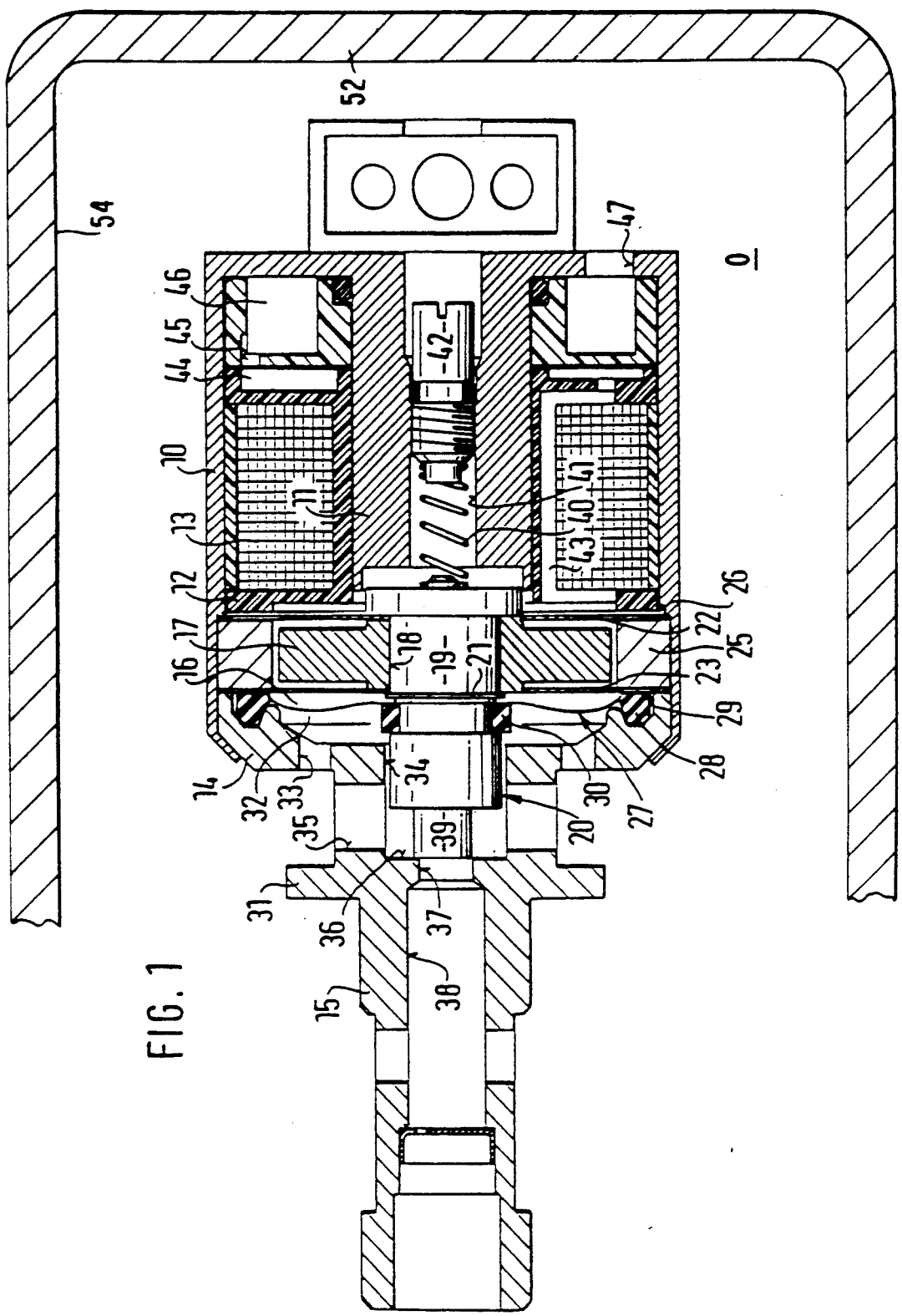
FIG. 1 is a longitudinal cross-sectional view through one embodiment of an electromagnetically operated valve according to the present invention.
Figure 2:
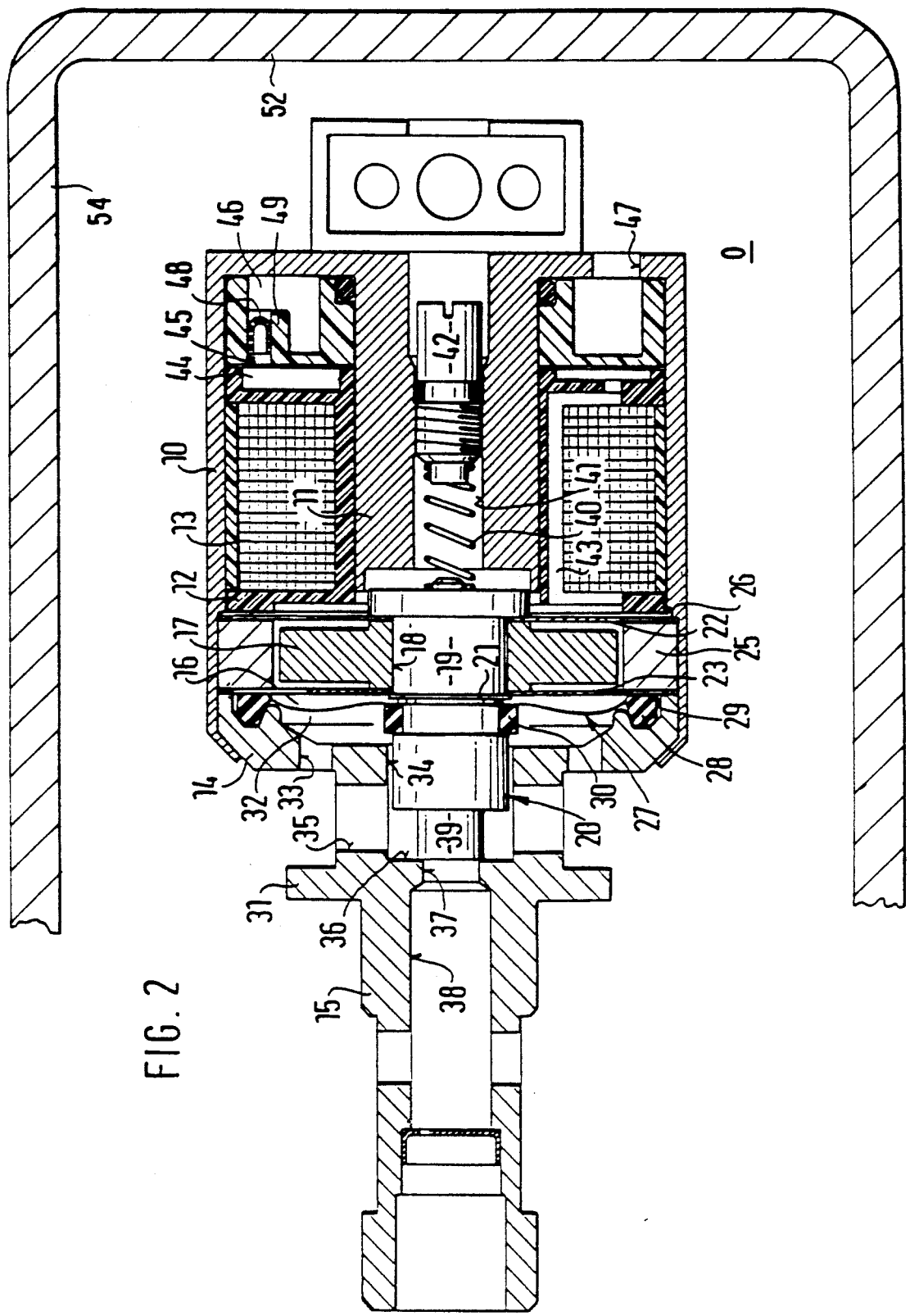
FIG. 2 is a longitudinal cross-sectional view through another embodiment of an electromagnetically operated valve according to the present invention.

The embodiments of the electromagnetic valve shown in FIGS. 1 and 2 have a roughly, bell shaped, metallic, housing 10, which has an extension 11 extending into the housing interior, around which the coil body 12 with winding 13 is arranged. Crimped into the open part of the housing 10 is the flange portion 14 of a valve part 15, which extends coaxially with the valve housing. The armature chamber 16 is arranged below the coil body 12 in the housing 10. This is where the resiliently supported armature 17, which is configured as a flat armature, is accommodated. It has a central hole 18, into which the head 19 of a valve body 20 is inserted, and is held by means of a retainer ring 21, which holds the armature, together with two membrane springs 22, 23, against the flange-type edge of the head 19. The membrane springs are held in the housing by their outer circumference, namely by means of an external ring 25 which is clamped between a ring shoulder 26 in the housing 10 and the flange portion 14 of the valve housing 15. Behind the membrane spring 23 is a flexible rubber membrane 27, which with its bead-like outer edge 28, is held in an annular groove 29 to the flange portion 14 and which rests with an internal annular bead 30 against the valve body 20. The rubber membrane serves to seal the valve part 15 against the armature chamber 16. Located below the flange portion 14 on the valve part 15 is a flange 31, with which the valve part, together with the housing 10, is fixed inside an engine part, such as a gear housing.

A shallow space 32 below the armature chamber 16, or the rubber membrane 27, has several holes 33 penetrating from the outside of the flange portion 14. The space 32 leads into a longitudinal hole 34, through which the valve body 20 projects with ample clearance. Connecting to the hole 34 is a straight-through transverse hole 35, and at the bottom of the hole 34 is a ring shoulder 36 from which a hole 37 extends coaxial with the hole 34, which leads into an expanded hole section 38, which extends through the entire valve part. All these latter holes are coaxial in relation to each other and coaxial in relation to the valve body 20. This body has an end section 39 which in the end position of the valve body blocks the hole 37. All the latter described parts, namely the space 32 and the holes mentioned, rest in the oil O of a gear housing 52.

The head 19 of the valve body 20 has a compression spring 40 acting on it, this spring being arranged within a hole 41 of the extension 11 and being supported on an adjusting screw 42.

The two membrane springs 22, 23 do not have a closed surface, but instead have several throughgoing openings. Membrane springs of this type are in common use with such valves and are not therefore further described. It is merely intended thereby to point out that pressurized media can disperse over the entire armature chamber 16. A duct 43 extends from the armature chamber along the coil body to a ring-shaped flat, first compensating chamber 44, from where a short hole 45 leads to a second compensating chamber 46, also ring-shaped. The two compensating chambers 44, 46 are partly in the coil body and partly in a plastic body, which is arranged at the base of the housing 10. From the second compensating chamber 46, a hole 47 leads to the oil-filled chamber 54 in the gear housing 52. The latter described spaces, namely the armature chamber 16, the duct 43, the hole 41, and also, partly, the first compensating chamber 44, are filled with clean oil for the purpose of damping the valve body. To prevent any contaminated oil from entering from the outside, i.e. from the gear housing, the second compensating chamber 46 is partly filled with air. It should be mentioned in this context that the whole valve is mounted in a horizontal position and that the upper part of the compensating chamber 46 has no link to the outside, so that there is always this cushion of air in this upper part, which extends via the hole 45 to the first compensating chamber 44. In the event of temperature related changes of volume of the armature chamber which is due to the movement of the armature 17 and hence also of the movement of the rubber membrane 27 which seals the armature chamber, the air cushion between the two compensating chambers is moved back and forth. This prevents any contaminated oil from entering the armature chamber, which could cause failure of the valve. The two oils - namely the clean and the contaminated oil - are separated from each other in all operating conditions by the air.

The embodiment example in accordance with FIG. 2 has a fixed gauze insert 48 in the hole 45 which links the compensating chamber 44 and 46. For this purpose, the hole is formed into an elongated connection piece 49. The gauze insert 48 has approximately the form of a beaker with a rounded base. Its open side faces the chamber 44. For storage and/or transportation of the valve, a linkage of the upper part of the compensating chamber 46 to the outside can occur due to deviation from the fitted position. The firmly fitted gauze insert 48 in the hole 45 prevents the clean oil from draining, since the hole 45 and the gauze insert 48 form a narrowing, ring-shaped, approximately conical, gap at the base of the gauze insert, through which the oil is drawn in and held due to surface and capillary forces, without allowing a pressure build-up in the open compensating chamber 44. The precise function of the valve is not detailed, since this is not essential to the invention, and in any case, is known. It may suffice to say that the valve body 20 and the head 39, respectively, control the connection from a pump, not shown, via the hole 35 to a container, or via another hole 48 in the valve housing 15 to a point of consumption.

While the invention has been illustrated and described as embodied in an electromagnetically operated valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. Electromagnetically operated valve communicating with a pressurized fluid in an oil-filled chamber, said electromagnetically operated valve comprising:
   a housing (10); an armature (17) resiliently retained in an armature chamber (16) of the housing (10) by spring retaining means; an armature-operated valve body (20) for control of a pressurized medium movable with clearance in a hole (34) provided in the housing (10) and a spring biasing means (40) biasing the armature;
   wherein the armature chamber (16) contains a damping fluid for the armature and the housing is also provided with a first compensating chamber (44) communicating with the armature chamber (16) and arranged at an end of the housing remote from the armature to compensate for volume changes of the damping fluid; and
   wherein the housing is also provided with a second compensating chamber (46) connected with the first compensating chamber via a duct (45), filled with air and communicating with the oil-filled chamber so that dirt and other particles in the pressurized fluid can not arrive in the damping fluid of the armature chamber.

2. Electromagnetically operated valve according to claim 1, wherein the spring biasing means comprises a compression spring (40).

3. Electromagnetically operated valve according to claim 1, wherein the spring retaining means for the armature comprises membrane springs (22,23).

4. Electromagnetically operated valve according to claim 1, wherein the armature (17) is a flat armature.

5. Electromagnetically operated valve according to claim 1, further comprising means to prevent escape of the air from the second compensating chamber (46) to the oil-filled chamber.

6. Electromagnetically operated valve according to claim 1, further comprising an oil-filled gear housing in which said oil-filled chamber is provided and means for fully flushing an oil in the oil-filled gear housing through the housing (10).

7. Electromagnetically operated valve according to claim 1, further comprising a valve part (15) against which the valve body (20) is urged by action of the spring-biasing means and a rubber membrane (27) in the housing (10) between the armature chamber (16) and the valve part (15) for sealing the armature chamber (16) from the valve part (15).

8. Electromagnetically operated valve according to claim 1, further comprising a gauze insert (48) located in an opening (45) between the first compensating chamber (44) and the second compensating chamber (46) for preventing flow of the fluid from the first compensating chamber into the second compensating chamber filled with the air.

9. Electromagnetically operated valve according to claim 8, wherein the gauze insert (48) is in the shape of a beaker having an open end closest to the first compensating chamber, said first compensating chamber being closer to the armature than the second compensating chamber.

* * * * *